United States Patent
Kawasumi et al.

(10) Patent No.: US 7,147,946 B2
(45) Date of Patent: Dec. 12, 2006

(54) FUEL CELL SYSTEM (75) Inventors: Emi Kawasumi, Yokohama (JP); Yasukazu Iwasaki, Yokohama (JP); Hiroyuki Ichikawa, Yokohama (JP)

(73) Assignee: Nissan Motor Co., Ltd., Kanawaga (JP)

(*) Notice: Subject to any disclaimer, the term of this patent is extended or adjusted under 35 U.S.C. 154(b) by 408 days.

(21) Appl. No.: 10/332,465

(22) PCT Filed: May 16, 2002

(86) PCT No.: PCT/JP02/04730

§ 371 (c)(1), (2), (4) Date: Jan. 9, 2003

(87) PCT Pub. No.: WO02/095853

PCT Pub. Date: Nov. 28, 2002

(65) Prior Publication Data

US 2003/0148154 A1 Aug. 7, 2003

(30) Foreign Application Priority Data

May 23, 2001 (JP) ............................ 2001-153599

(51) Int. Cl.
*H01M 8/04* (2006.01)
(52) U.S. Cl. ......................................... 429/13; 429/22
(58) Field of Classification Search .................. 429/20, 429/24, 13, 22
See application file for complete search history.

(56) References Cited

U.S. PATENT DOCUMENTS 4,931,947 A * 6/1990 Werth et al. ................. 700/297
6,641,795 B1 * 11/2003 Abe ........................ 423/648.1
6,797,418 B1 * 9/2004 Nomura et al. ............... 429/13

FOREIGN PATENT DOCUMENTS

| EP | 0 941 963 A | 9/1999 |
|---|---|---|
| EP | 1 014 464 A | 6/2000 |
| EP | 1 198 020 A2 | 4/2002 |
| JP | 6-215786 | 8/1994 |
| JP | 6-349510 | 12/1994 |
| JP | 08-167420 | 6/1996 |
| JP | 09-231991 | 9/1997 |
| JP | 9-231991 | 9/1997 |
| WO | WO 02/23659 A | 3/2002 |

* cited by examiner

*Primary Examiner*—Mark Ruthkosky
(74) *Attorney, Agent, or Firm*—McDermott Will & Emery LLP (57) ABSTRACT

A fuel cell system is provided which performs simple control of the time until warm-up of the reformer (1) is completed. This fuel cell system comprises a reformer (1) which generates a reformate gas, and a fuel cell (2) which generates power from an oxidizing agent and the reformate gas supplied from the reformer (1). The fuel cell system is provided with a temperature sensor (7) which performs a detection at one position of the temperature immediately before starting or re-starting the reformer (1) and a controller (6) estimating the time to warm-up the reformer (1) based on the detected temperature of the reformer (1).

10 Claims, 11 Drawing Sheets

FUEL CELL SYSTEM

FIELD OF THE INVENTION

This invention relates to a fuel cell system provided with a fuel reformer.

BACKGROUND OF THE INVENTION

One type of fuel cell system is a fuel reforming system. This type of fuel cell system is provided with a reformer which produces a reformate gas by reforming a fuel containing hydrogen atoms (for example, hydrocarbon), and a fuel cell which generates electricity by electrochemical reactions which are generated by supplying the reformate gas and a gas containing oxygen to each electrode.

When starting up the fuel cell, the problem arises that the generated power is insufficient compared with the required power due to the low hydrogen utilization factor in the fuel cell. A fuel cell is generally operated above ordinary temperature. But the system does not display efficient operation until the temperature of fuel cell reaches a predetermined temperature.

Further, when the hydrogen amount in the reformate gas produced by the reformer is not sufficient for generating the required power, it is not possible to generate the required power in the fuel cell.

As a result, the fuel cell system requires a period in which the temperature of the fuel cell is increased to the predetermined temperature and a warm-up period until the reformer produces a reformate gas containing a sufficient hydrogen amount for generating the required power. Normally, during start-up of the fuel cell system, the fuel cell and the reformer are started at the same time. However, the warm-up period of the reformer is generally longer than that of the fuel cell. And, warm-up of the reformer may be started in advance of that of the fuel cell in order to finish both worm-up simultaneously.

The reformer generally comprises a plurality of reactors; for example a reforming reactor for producing a reformate gas and a carbon monoxide removal reactor which removes carbon monoxide in the reformate gas produced by the reforming reactor. In order to confirm completion of warm-up, it is necessary to determine that the temperature of these reactors has increased to respective target values. So, it is necessary to provide temperature sensors in each of the reactors. After warm-up is completed, a fuel gas such as methanol and an oxidizing gas such as air are supplied to the reformer and produce hydrogen-rich reformate gas by reformate reactions.

Each of the reactors displays the own temperature distribution which varies depending on environmental conditions such as the external air temperature and the frequency of use during startup. Therefore, it is necessary to control the warm-up process considering the temperature distribution of the reactors. For example, Tokkai Hei 6-349510 published by the Japanese Patent Office in 1994 discloses a fuel cell system provided with a sensor which detects the temperature distribution of the reactors in the reformer.

SUMMARY OF THE INVENTION

However when it is determined the end of reformer warm-up that is based on the actually detected temperature distribution of the reformer, or the multiple detected values of the temperature sensor, the problem arises that the structure of the fuel cell system becomes complicated and control processes during startup of the fuel cell system also becomes complicated.

It is therefore an object of this invention to simplify control processes during startup of the fuel cell system and to simplify the structure of the fuel cell system.

In order to achieve above object, this invention provides a fuel cell system, having a reformer which generates a hydrogen-rich reformate gas; a fuel cell which generates power using an oxidizing gas and the reformate gas supplied from the reformer, the fuel cell having a fuel cell stack and a power control circuit for controlling power generation and an output to a load circuit; and a heating device for warming the reformer; the fuel cell system comprising: a temperature sensor which detects a temperature of the reformer at a single position; and a controller.

The controller functions to: set a warm-up period of the reformer based on the temperature of the reformer detected immediately before warm-up; and control the heating device so that the warm-up operation of the reformer is performed within the warm-up period.

The details as well as other features and advantages of this invention are set forth in the remainder of the specification and are shown in the accompanying drawings.

DESCRIPTION OF THE PREFERRED EMBODIMENTS

Figure 1:
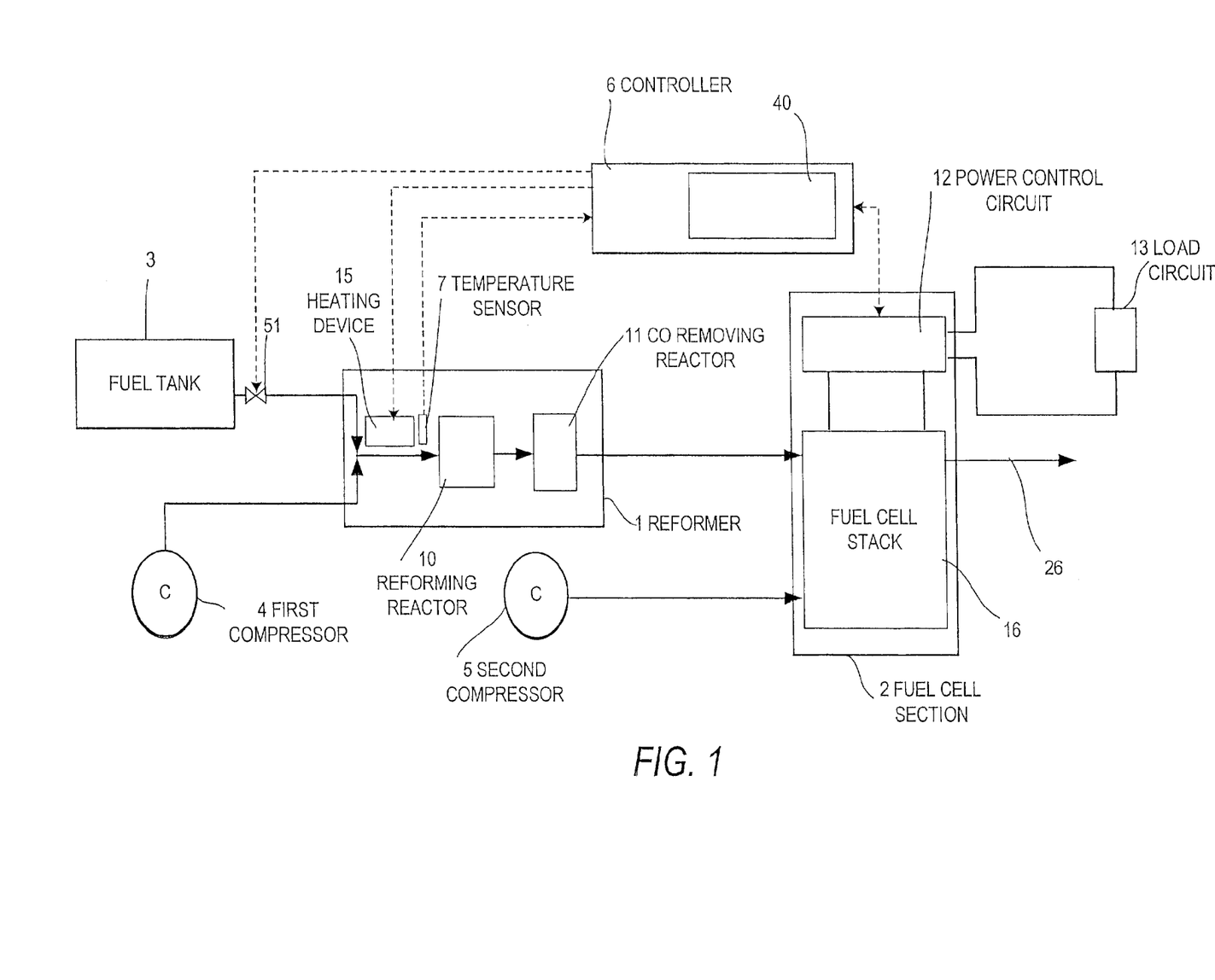
FIG. 1 is a schematic figure of a fuel cell system according to a first embodiment of this invention.

Referring to FIG. 1, a fuel cell system according to this invention will be described. The fuel cell system comprises a reformer 1, a fuel cell 2, a fuel tank 3, a first compressor 4, a second compressor 5, a controller 6, a heating device 15, and a temperature sensor 7. The reformer 1 generates a reformate gas by supplying air as an oxidizing gas together with a fuel gas. The fuel cell 2 is provided with a fuel cell stack 16 comprising an anode (namely, fuel electrode) supplied with a hydrogen-rich reformate gas from the reformer 1 and a cathode (namely, oxygen electrode) supplied with a gas containing oxygen. The fuel cell 2 generates power from the electrodes by electrochemical reactions. The first and second compressor 5 functions as a source of an oxidizing gas such as air.

The fuel cell 2 is further provided with a power control circuit 12 which preferably comprises an inverter and a DC-DC converter. The amount of power generated by the fuel cell stack 16 and output from the fuel cell 2 is controlled based on commands to the power control circuit 12 by the controller 6.

Fuel supplied from the fuel tank 3 to the reformer 1 is not limited to a gaseous fuel (fuel gas) but may also be liquid or solid fuel. When the fuel is a liquid or solid type, it is necessary to provide a vaporizer between the reformer 1 and the fuel tank 3 in order to supply fuel gas to the reformer 1. Thus it is possible to increase the types of usable fuels by disposing a vaporizer in the system.

The fuel tank 3 is provided with a water tank (not shown) when a reforming reactor 10 of the reformer 1 performs an autothermal reaction. In the autothermal reaction, a mixture of vaporized methanol and steam is supplied to the reformer 1 as a fuel gas.

The controller 6 is provided with a microcomputer 40 having a central processing unit (CPU), a random access memory (RAM), a read-only memory (ROM) and an input/output interface. Therefore, the controller 6 is programmable. The controller 6 controls the warm-up operation of the reformer 1.

In this embodiment, the reformer 1 comprises a plurality of reactors, for example, a reforming reactor 10 which produces a reformate gas and a CO removing reactor 11 which removes carbon monoxide (CO) in the reformate gas until a predetermined concentration of CO is reached.

Air from the first compressor 4 and fuel gas from the fuel tank 3 is supplied to the reformer 1. A second compressor 5 supplies air to the cathode of the fuel cell 2.

The heating device 15 warms the reformer 1. The controller 6 electrically controls operations of the heating device 15. In the preferred embodiments, the use of a known heating device 15 and heating method for warming-up reformer 1 are allowed. The heating device 15 may be a combustor which burns the fuel from the fuel tank 3 or combustible components in a discharge gas from the fuel cell stack 16 with the air from the first compressor 4, generating heat. Also, the heating device 15 may be an electric heater for heating the reformer 1.

A single temperature sensor 7 is provided in the reformer 1 in order to detect the temperature in the reformer 1. The detected temperature of the temperature sensor 7 is transmitted to the controller 6. The controller 6 sets the warm-up period of the reformer 1, using a pre-set map and the detected temperature. During warm-up operations for the reformer 1, power generation in the fuel cell 2 is not performed.

The controller 6 controls the output or the power generation of the fuel cell 2 through the power control circuit 12. Generated power is supplied to a load circuit 13 such as motor through the power control circuit 12.

The measurement position for the temperature of the reformer 1 detected by the temperature sensor 7 is not limited. However it is preferable that the measurement position is in the inlet of the reforming reactor 10 of the reformer 1.

Figure 2:
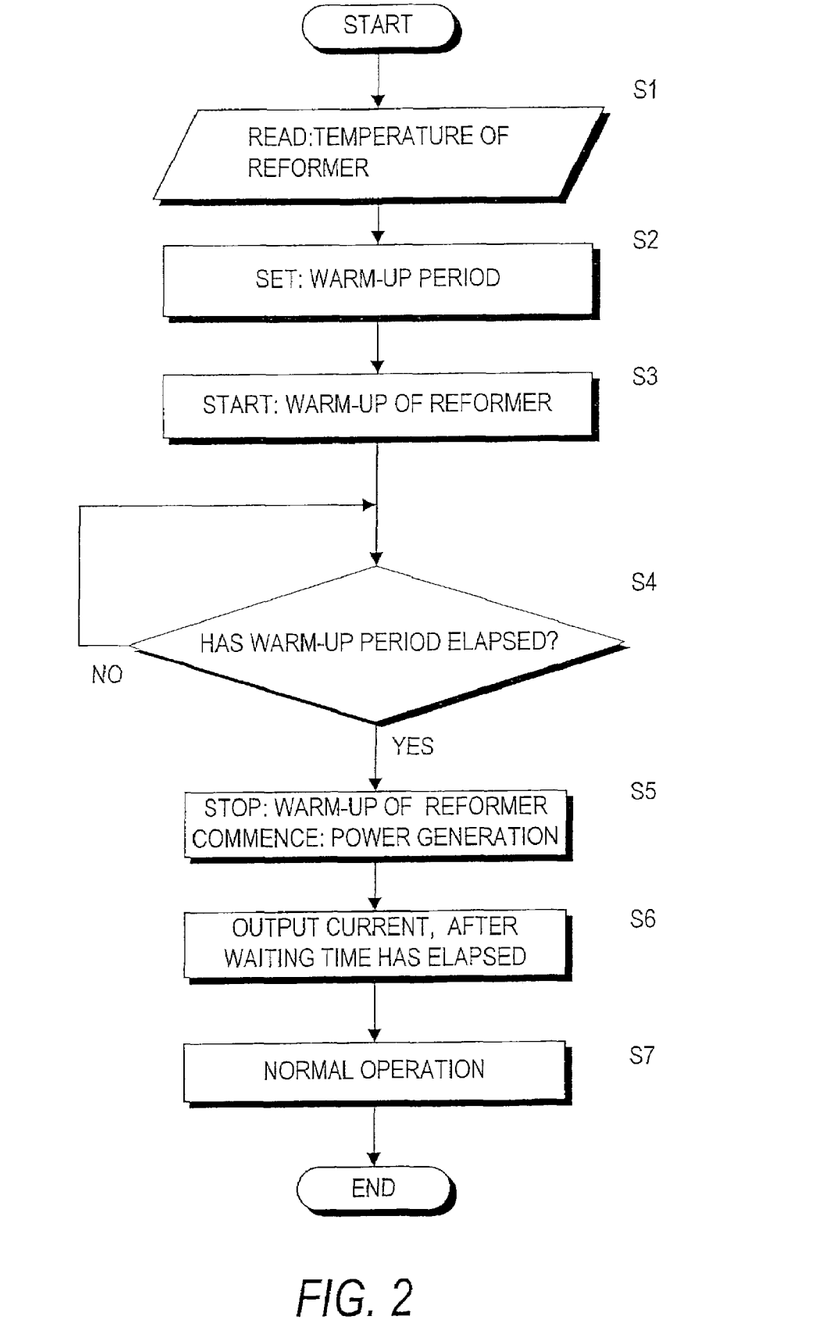
FIG. 2 is a flowchart describing control performed by a controller according to the first embodiment of this invention.

Referring to FIG. 2, the startup routine of the reformer 1 executed by the controller 6 will be described. Firstly in a step S1, the temperature of the reformer 1 is read immediately before warm-up operation by using a temperature sensor 7. In a step S2, the warm-up period of the reformer 1 is set from the detected temperature by looking up a first map described hereafter. In a step S3, warm-up of the reformer 1 is started. Here, the heating device 15 is commanded to start warming the reformer 1. Further, an electrically controlled outlet valve 51 of the fuel tank 3 is commanded to open in order to pass the fuel. Then the reformer 1 is warmed up within the set warm-up period.

In a step S4, it is determined whether or not the warm-up period of the reformer 1 has elapsed. Until the warm-up period has elapsed, the routine repeats the determination process of the step S4. When the warm-up period has elapsed, the routine proceeds to a step S5. In the step S5, the warm-up of the reformer 1 is stopped and power generation by the fuel cell 2 is commenced. Here, the heating device 15 is commanded to stop warming the reformer 1. In the step S6, after a waiting time has elapsed, current (power) is supplied to the load circuit 13. Here, the controller 6 commands the power control circuit 12 to start output of current. The waiting time corresponds to a time-lag until a target power generation is reached in the fuel cell 2, and is set using the second map described hereafter referring to FIG. 4. In a step S7, startup operation for fuel cell system is completed and the fuel cell system is shifted to normal operation.

Figure 3:
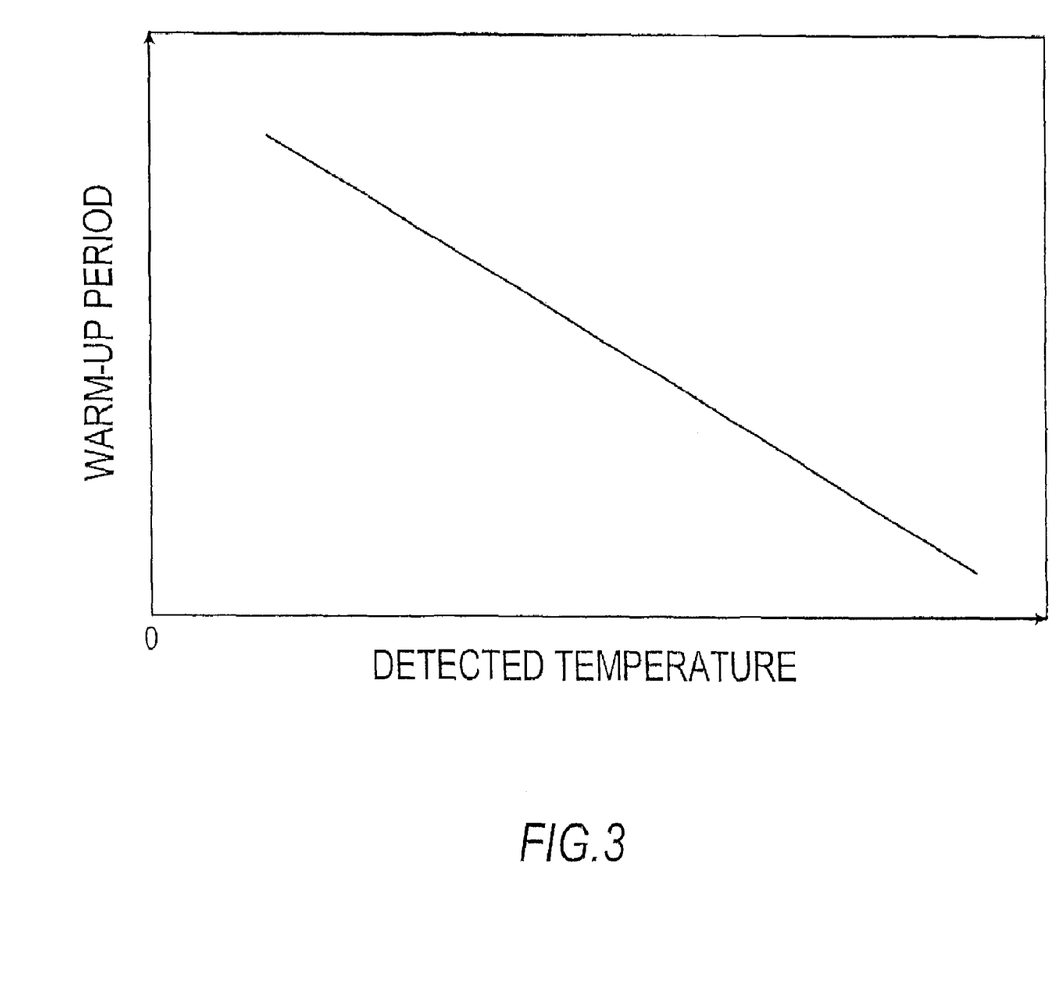
FIG. 3 is a map specifying the relationship of the warm-up period of the reformer and the detected temperature of the reformer.

The first map used in order to set the warm-up period of the reformer 1 in the step S2 will be described hereafter. The first map specifies the relation between the temperature detected immediately before warm-up operation and the warm-up period. Hereafter, temperature detected immediately before warm-up operation is referred to as "startup temperature".

In each reactor of the reformer 1, in view of the constituent material or heat transfer characteristics, the temperature distribution in each reactor is varied to homogenize the distribution after reactions cease. Thus it is possible to regard the temperature distribution immediately before warm-up of the reformer 1 as homogenized.

The profile of reformate reactions is predicted and allows estimation of the warm-up period for the reformer 1. More precisely, the vigorousness of the reformate reactions at a given temperature of the reformer (which is measured at the measurement position) is estimated. From this estimation, a temperature, at which the production rate of hydrogen in the reformer 1 will be a predetermined amount sufficient to cause power in the fuel cell 2, is estimated. Namely, a temperature of the measurement position, at which the catalyst of the reforming reactor 10 is activated, is estimated. The warm-up period shown in the map of FIG. 3 is estimated as the time that elapses from the beginning of warm-up until the temperature at the measurement position reaches the temperature at which the production rate of hydrogen in the reformer 1 will be the predetermined amount. Therefore, the warm-up period increases with the decrease of the temperature immediately before warm-up operation (startup temperature).

As a result, a first map is provided describing the relationship of the warm-up period and the startup temperature. Thus it is possible to set the warm-up period from the first map by detecting the temperature of the reformer 1 with the temperature sensor 7.

In this embodiment, the load on the reformer 1 is fixed during startup. Consequently the first map is a map showing a fixed load on the reformer 1 during warm-up. The load on the reformer 1 may be the flow rate of fuel gas flowing into the reformer 1.

Figure 4:
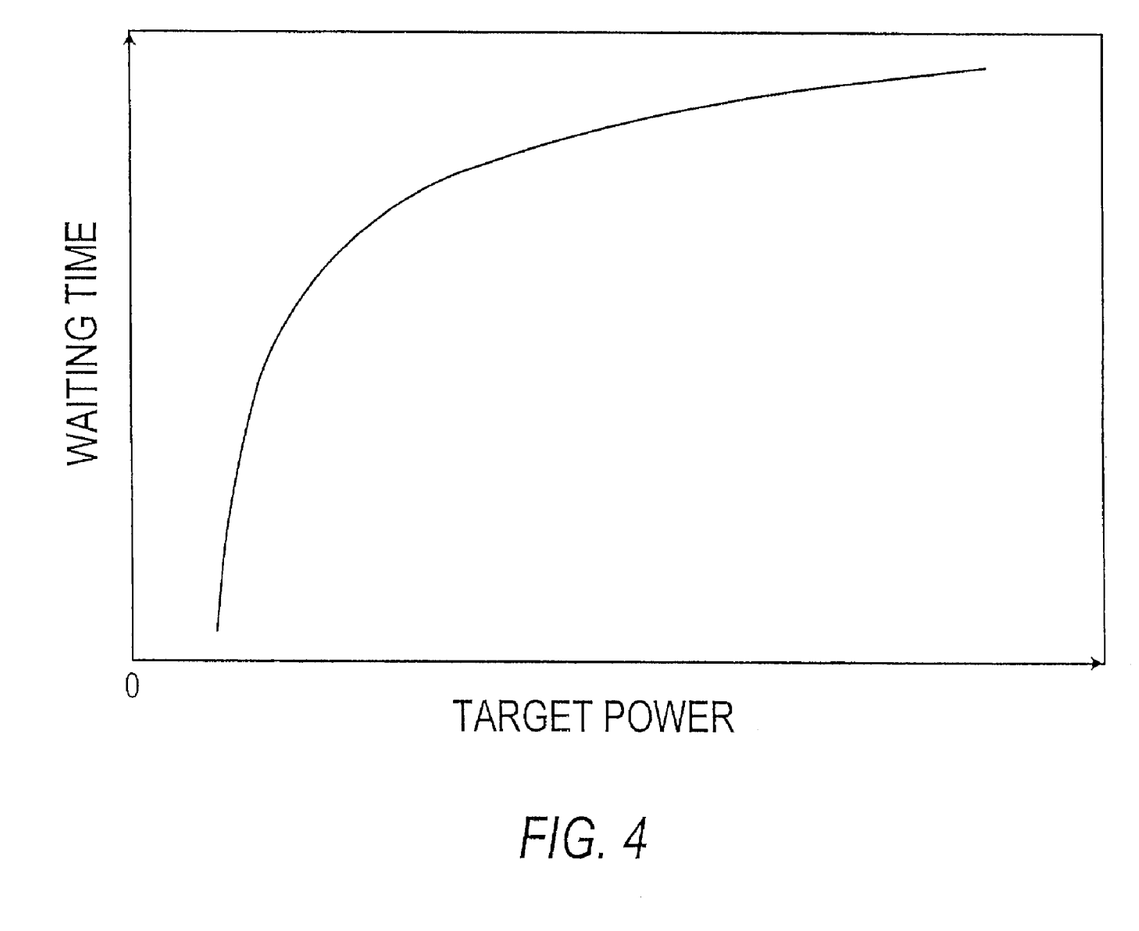
FIG. 4 is a map specifying the relationship of the target power and a waiting time.

FIG. 4 is a second map specifying the relation between the target power and the waiting time from completion of warm-up of the reformer 1 (namely, the commencement of power generation by the fuel cell 2) to the time when the generated power in the fuel cell 2 reaches the target power (when the load on the reformer 1 is fixed).

Even when a flow of reformate gas required for supplying the target power is generated in the reformer 1, a delay occurs until the fuel cell 2 supplies the target power. The second map represents the waiting time which corresponds to that delay time. This delay, that is to say time lag, is a result of the fact that reformate gas from the reformer 1 is supplied to the fuel cell 2 with a time lag of first order. Thus this time lag is obtained from a curve approximating a first order response as shown in FIG. 4.

The controller 6 stores a first map as shown in FIG. 3 for setting the warm-up period from the detected temperature immediately before warm-up of the reformer 1 and a second map as shown in FIG. 4 for setting the waiting time (time lag) until the target power is generated after the commencement of power generation (namely, after completion of warm-up).

The controller 6 stops output from the fuel cell 2 to the load circuit 13 through the power control circuit 12 until a condition is realized in which power generated from the fuel cell 2 is output at a target power in a stable manner. Namely, the controller 6 stops output from the fuel cell 2 to the load circuit 13 during the period of the time lag. During the period of the time lag, the power control circuit 12 and fuel cell stack 16 consume power generated in the fuel cell 2. Consequently it is possible to control power generation in a more stable manner.

Furthermore the startup control according to this invention requires that the temperature is detected only at a single position in the reformer 1. As a result, the startup control of the fuel cell system is simplified due to the fact that startup control of the reformer 1 and control of the output of the fuel cell 2 is controlled by a single temperature output signal and the two maps described above. Furthermore the structure of the fuel cell system can be simplified and downsized and it is possible to reduce the costs associated with the fuel cell system.

A second embodiment of this invention applies the startup routine for the reformer 1 described in the first embodiment to a hot restart operation.

The term "hot restart" will be described below. When power generated in the fuel cell 2 exceeds power consumption in the load circuit 13 and a charging state results, the controller 6 suspends power generation in the fuel cell 2 via the power control circuit 12. In this case, the controller 6 stops fuel supply to the reformer 1 by commanding the electrically controlled outlet valve 51 of the fuel tank 3, in order to suspend reformate reactions in the interests of system efficiency. When reformate reactions of the reformer 1 are stopped, the temperature of each reactor comprising the reformer 1 is reduced. Power generation by the fuel cell 2 is restarted, when the controller 6 starts reformate reactions by commanding the electrically controlled outlet valve 51 to pass the fuel after warming up the reformer 1. That is to say, after warming up the reformer 1, reformate gas is supplied to the fuel cell 2 and power generation is commenced.

In this state, the temperature of the reformer 1 is reduced by suspending reformate reactions. However the reformer 1 startup from a temperature which differs from normal startup (cold startup) and is relatively high when compared with the ordinary temperature. Such a startup operation is termed hot restart. During hot restart, it is also possible to set the warm-up period using a map and detecting the startup temperature of the reformer 1 in the same manner as the first embodiment.

Thus a fuel cell system performing hot restart, the reformer is stopped when power generation is not required, and the reformer 1 and the fuel cell 2 are operated in response to power supply requirements. In this manner, it is possible to improve the operating efficiency of the fuel cell system.

Figure 5:
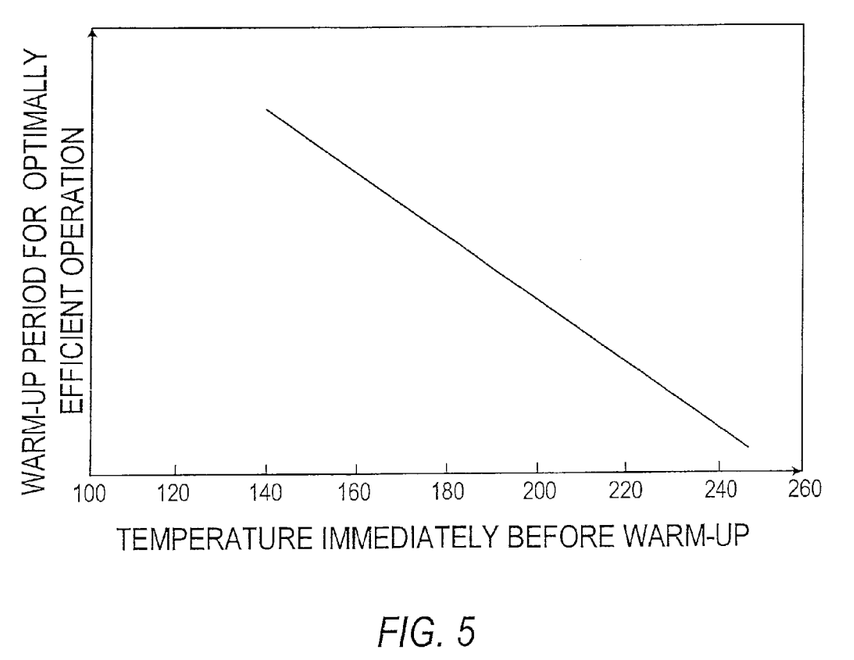
FIG. 5 is a map specifying the relationship of the temperature immediately before warm-up and the optimal warm-up period.

FIG. 5 is a third map for the second embodiment which describes the relationship between the warm-up period (from the beginning of warm-up of the reformer 1 until optimally efficient operation can be commenced) and the temperature immediately before warm-up of the reformer 1. The microcomputer 40 of the controller 6 stores the third map and performs the control routine shown in FIG. 2 using the third map. It is possible to improve the efficiency of the fuel cell system by starting power supply after starting optimally efficient operation of the reformer 1. When this fuel cell system is mounted in a vehicle, it is possible to improve the fuel economy of the vehicle.

Figure 6:
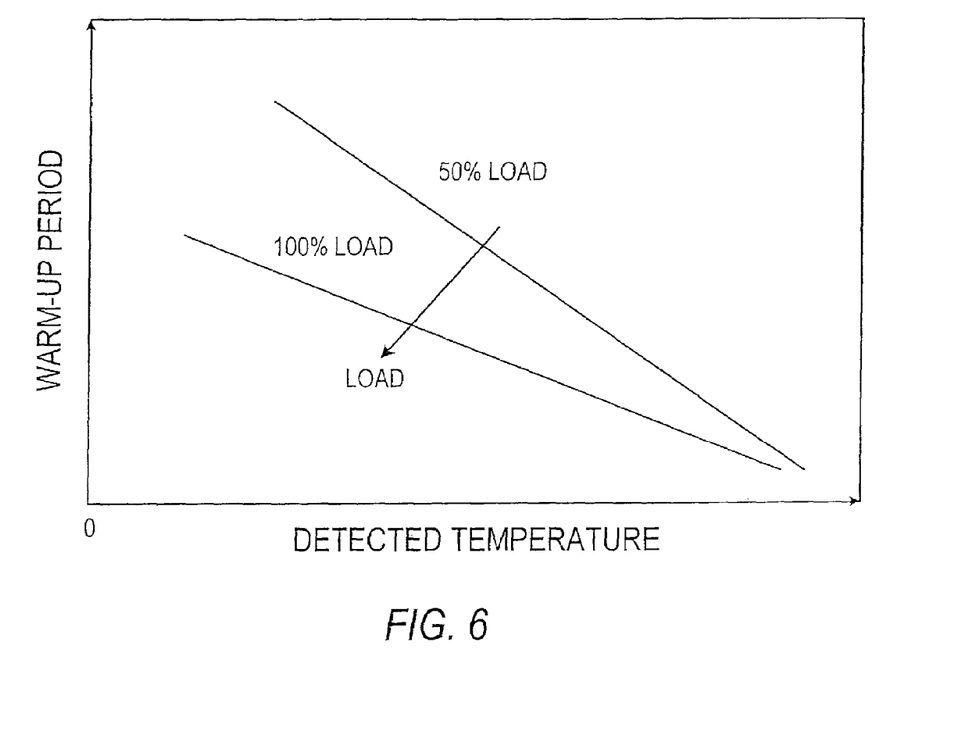
FIG. 6 is a map specifying the warm-up period of the reformer and the detected temperature of the reformer based on the load.

Referring to FIG. 6, the third embodiment will be described. FIG. 6 is a fourth map describing a relationship between the startup temperature of the reformer 1 and the warm-up period. This map is similar to the map in FIG. 3, however it takes into account the load on the reformer 1 corresponding to the target power generation of the fuel cell 2. In the first embodiment, it is assumed that load on the reformer 1 during startup is fixed. The controller 6 in the third embodiment sets the warm-up period in response to load on the reformer 1. The fourth map in FIG. 6 is stored in microcomputer 40 of the controller 6.

Figure 7:
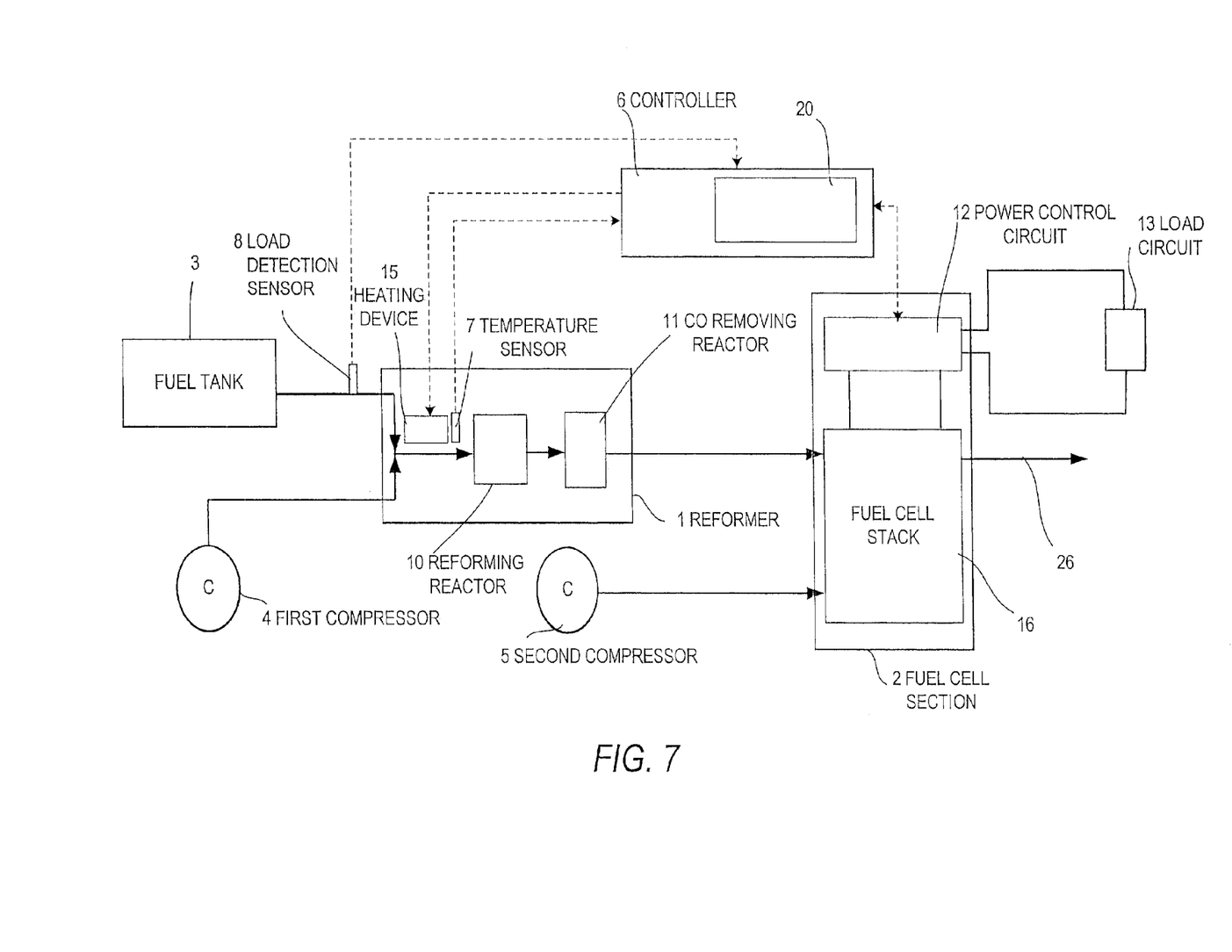
FIG. 7 is a schematic view of a fuel cell system according to a third embodiment of this invention.

FIG. 7 shows a fuel cell system according to a third embodiment of this invention. The fuel cell system according to the third embodiment is provided with a load detection sensor 8. The load detection sensor 8 is a gas flow rate sensor which is provided upstream of the reformer 1. However the load detection sensor 8 is not limited to a gas flow rate sensor and may be a sensor which detects the depression amount of an accelerator pedal when the fuel cell system is mounted in a vehicle. The controller 6 sets the warm-up period of the reformer 1 from a fourth map in FIG. 6 based on the startup temperature of the reformer 1 and the detected load of the reformer 1 (for example gas flowrate) by the load detection sensor 8.

Figure 8:
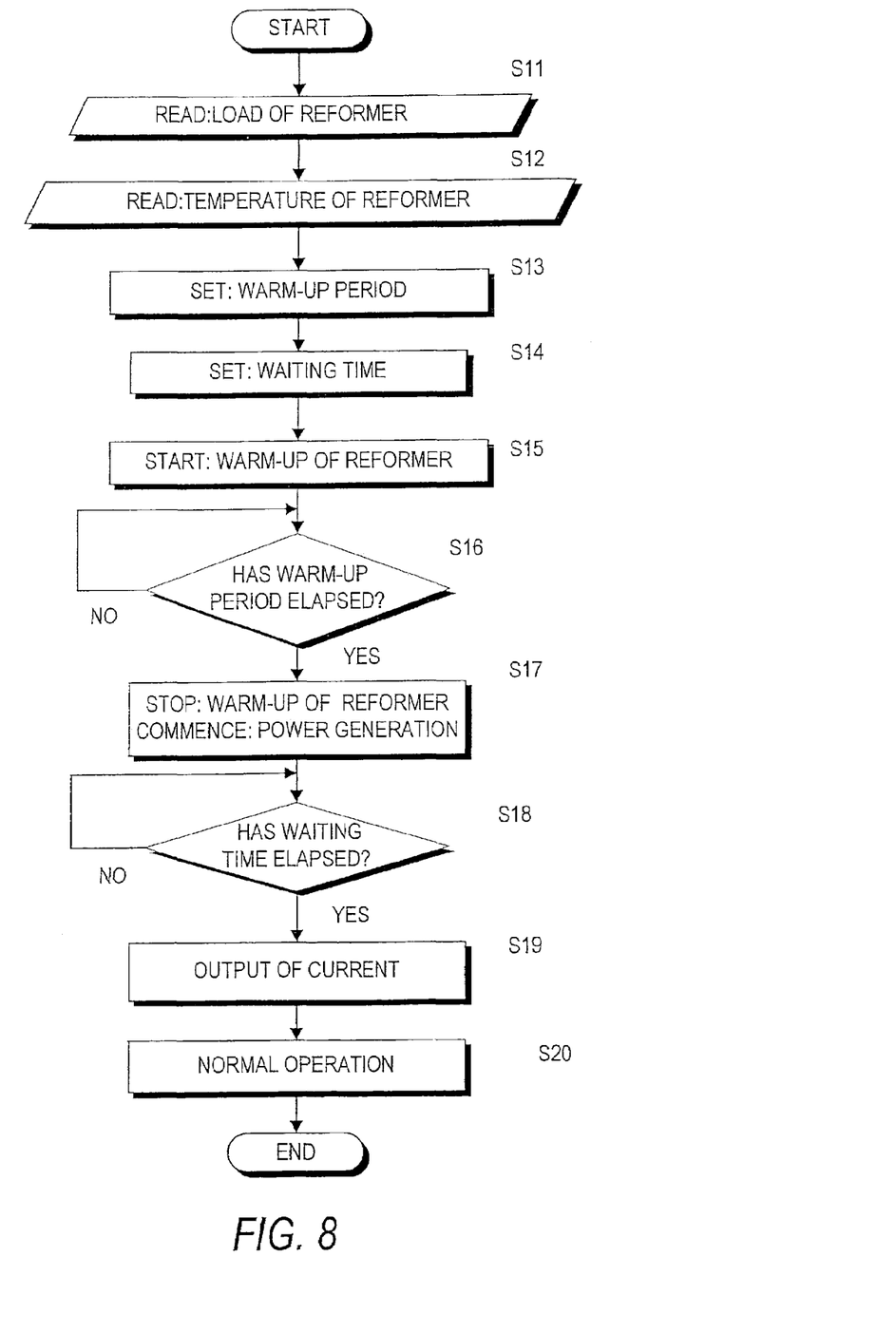
FIG. 8 is a flowchart describing control performed by a controller according to the third embodiment of this invention.

Referring to the flowchart in FIG. 8, the startup control performed by the controller 6 in the third embodiment will be described.

Firstly in a step S11, the load of the reformer 1 immediately before warm-up of the reformer 1 is read using a load detection sensor 8. Then in a step S12, the startup temperature of the reformer 1 is detected using a temperature sensor 7. In a step S13, the warm-up period of the reformer 1 (time that elapses before the production rate of hydrogen in the reformer 1 has become the predetermined amount) is set from the fourth map shown in FIG. 6, based on the detected temperature and the load on the reformer 1 detected by the load detection sensor 8.

Next, in a step S14, a waiting time after starting power generation in the fuel cell 2 until a current is output is set by looking up the map in FIG. 4 based on the target power. The waiting time is not necessary to be shown in the form of a map. The waiting time may be a fixed value which is suitable when maximum load is applied to the reformer 1. The total time required to the startup of the fuel cell system is the sum of the warm-up period for the reformer 1 and the waiting time.

In a step S15, warm-up of the reformer 1 is commenced. Namely, the heating device 15 is commanded to start warming the reformer 1. In a step S16, it is determined whether or not the elapsed time after starting warm-up has reached the set warm-up period. Namely, the warm-up operation is performed until the set warm-up period has elapsed. When the warm-up period has elapsed, the routine proceeds to a step S17. In the step S17, the warm-up of the reformer 1 is stopped and the power generation in the fuel cell 2 is commenced. Here, the heating device 15 is commanded to stop warming the reformer 1, and the power control circuit 12 is commanded to start power generation of the fuel cell stack 16.

Thereupon the routine proceeds to a step S18. In the step S18, it is determined whether or not the waiting time set in the step S14 has elapsed after completion of the warm-up operation for the reformer 1. When the waiting time has elapsed, the routine proceeds to a step S19 where output of current from the fuel cell 2 to the load circuit 13 is commenced. Here, the controller 6 commands the power control circuit 12 to start output of current. In a step S20, startup operation of the fuel cell system is completed and the fuel cell system shifts to normal operation.

In the third embodiment, it is possible to set the warm-up period for the reformer 1 in response to the load applied to the reformer 1. The load detection sensor 8 for detecting the load is provided in the fuel cell system. As a result, it is possible to eliminate unnecessary warm-up period and to improve the efficiency of the system.

Figure 9:
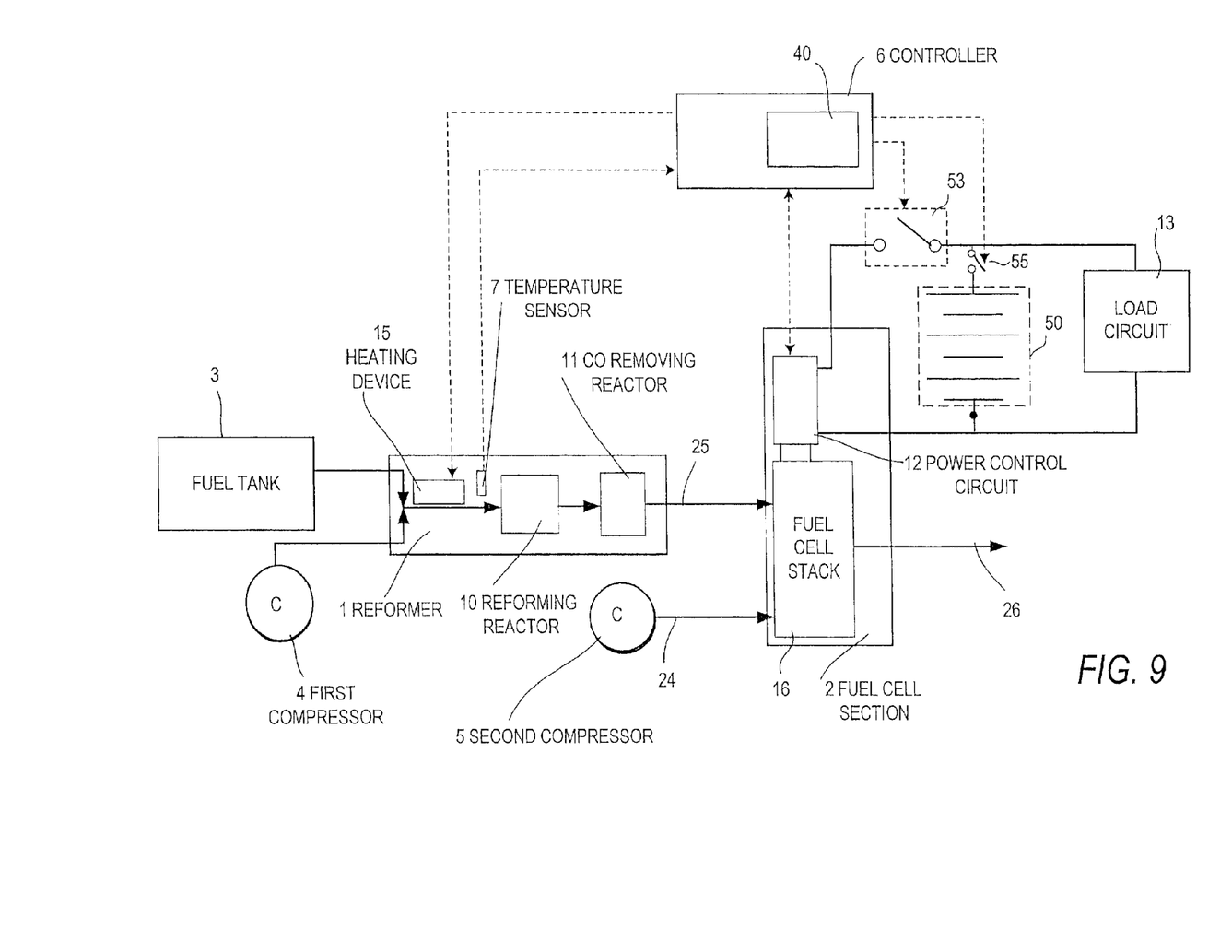
FIG. 9 is a schematic view of a fuel cell system according to a fourth embodiment of this invention.

Referring to FIG. 9, a fourth embodiment will be described. In the fourth embodiment, a secondary battery 50 is connected to the fuel cell 2 via a switch 55. It is possible to supply power to the load circuit 13 from the secondary battery 50 until completion of warm-up operation for the reformer 1, that is to say, until a sufficient flow amount of hydrogen is supplied to the fuel cell 2. As a result, it is possible to supply power to the load circuit 13 in a stable manner even during warm-up of the reformer 1. Power supply source is switched between the fuel cell 2 and the secondary battery 50 depending upon whether the reformer is warming up. The controller 6 controls the operation of switches 53 and 55. The switch 55 for the secondary battery 50 is connected and the switch 53 between the fuel cell 2 and the load circuit 13 is disconnected while the reformer is warming up.

Furthermore when power generated in the fuel cell 2 exceeds the required power generation, it is possible to charge the secondary battery 50 with the excess power by connecting the switch 55 and as a result, to improve the efficiency of the fuel cell system.

Figure 10:
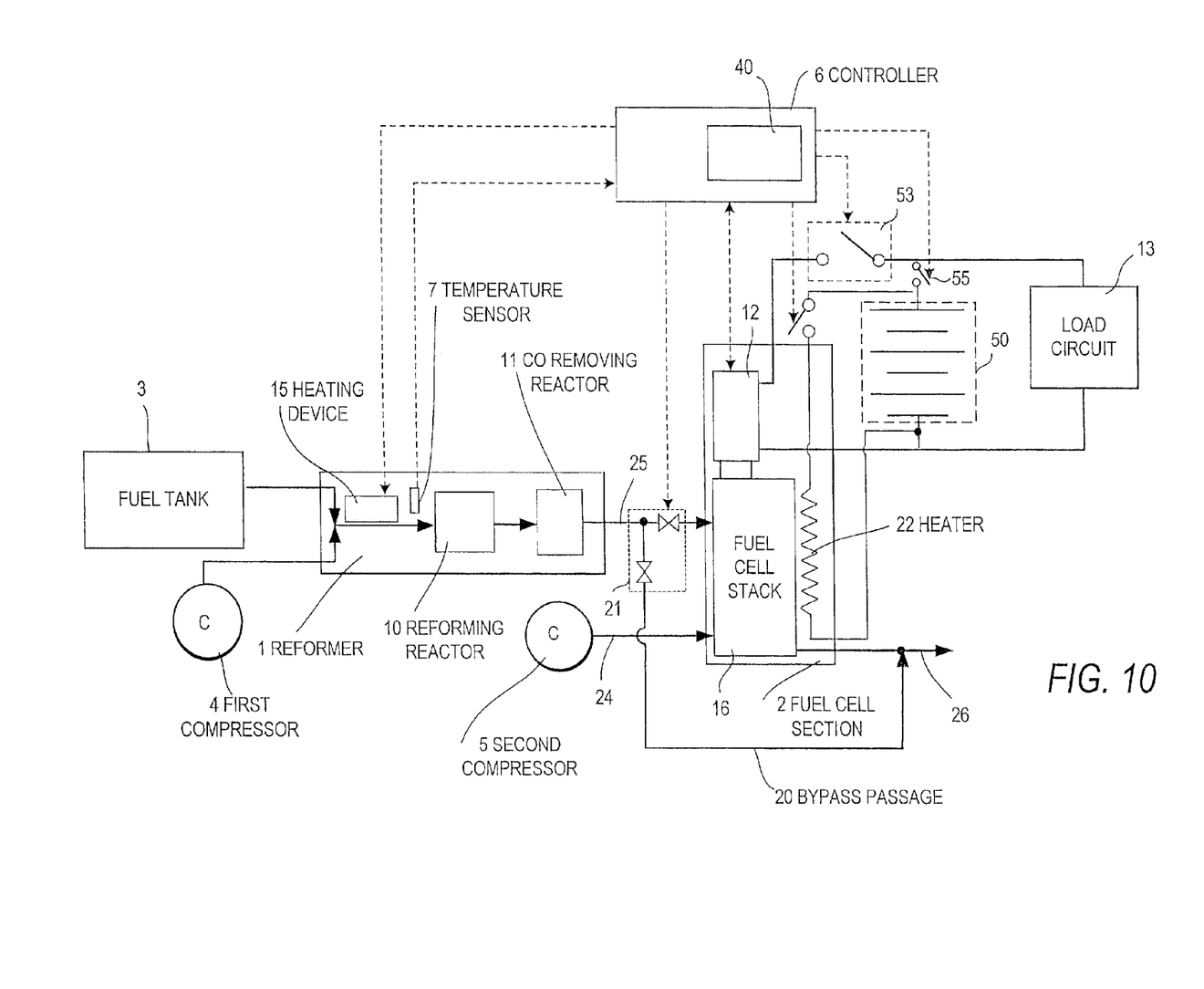
FIG. 10 is a schematic view of a fuel cell system according to a fifth embodiment of this invention.

Referring to FIG. 10, a fifth embodiment of this invention will be described. The difference between the first embodiment and the fifth embodiment is that unreformed gas containing a high-concentration of CO discharged from the reformer 1 during warm-up of the reformer 1 is not supplied to the fuel cell 2 in the fifth embodiment. The fuel cell system is provided with a bypass passage 20 which bypasses the fuel cell 2. The bypass passage 20 branches from the passage 25 between the reformer 1 and the fuel cell 2 and is connected to the outlet passage 26 of the fuel cell 2. The controller 6 controls an electrically-controlled switching valve 21 in order to prevent supply of unreformed gas to the fuel cell 2 during warm-up of the reformer 1. In the fifth embodiment, since a bypass passage is provided, the fuel cell stack 16 of the fuel cell 2 is prevented from being damaged by CO and it is possible to prevent reductions in power generation performance.

Since the bypass passage prevents the supply of high-temperature unreformed gas during startup of the reformer 1 to the fuel cell 2, the fuel stack 16 of the fuel cell 2 is heated by a heater 22 during startup of the fuel cell 2. The current from the secondary battery 50 may be supplied to the heater 22. In this manner, the startup time of the fuel cell 2 is shortened and it is possible to downsize and reduce costs associated with the fuel cell system.

Figure 11:
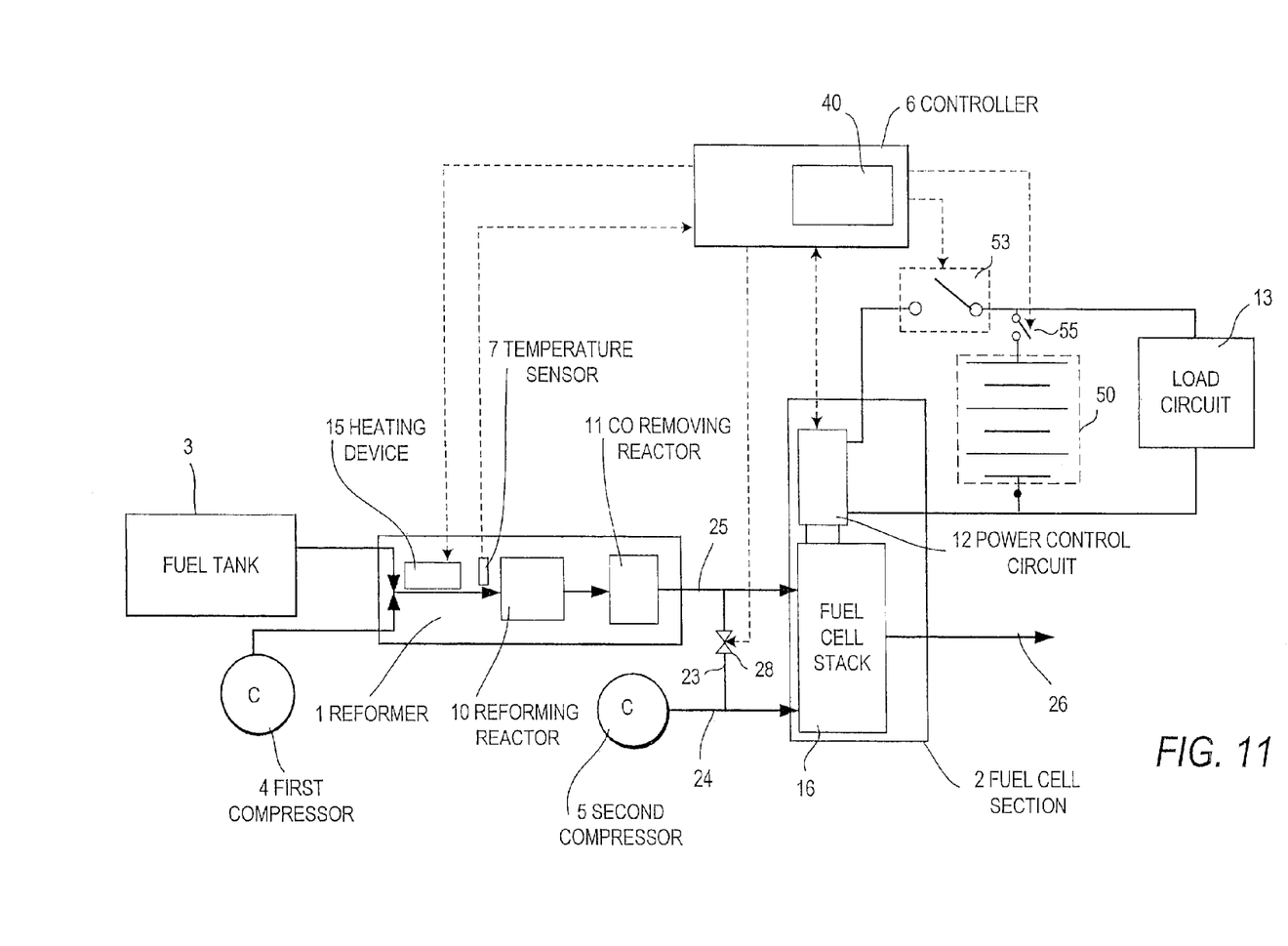
FIG. 11 is a schematic view of a fuel cell system according to a sixth embodiment of this invention.

Referring to FIG. 11, a sixth embodiment of this invention will be described. The difference between the first embodiment and the sixth embodiment is that an oxidizing agent (for example, air) is supplied together with unreformed gas to the anode (fuel side) during startup of the reformer 1. In the sixth embodiment, the fuel cell system is provided with an oxidizing agent passage 23 which mixes air from the second compressor 5 with unreformed gas. The oxidizing agent passage 23 connects the passage 25 between the reformer 1 and the fuel cell 2 with the passage 24 between the second compressor 5 and the fuel cell 2. This enables oxidization of reduction gas components mainly comprising CO in the unreformed gas. The controller 6 controls the electronically controlled valve 28 to open during startup of the reformer 1. In this manner, toxicity in the fuel cell 2 is prevented. Furthermore since the fuel cell 2 is heated by heat produced by the reaction between CO and oxygen in the reformate gas, the startup time of the fuel cell 2 can be shortened.

In the above embodiments, the warm-up period of the reformer 1 is estimated as the time until a predetermined hydrogen amount is produced. However the invention is not limited in this respect and the warm-up period can be estimated by estimating the time taken for either the temperature of the reformer 1 or the constituent amount of a specific gas such as CO or CO2 in the reformate gas to reach a predetermined amount.

Although the invention has been described above by reference to certain embodiments of the invention, the invention is not limited to the embodiments described above.

The entire contents of Japanese Patent Application P2001-153599 (filed May 23, 2001) are incorporated herein by reference.

Modifications and variations of the embodiment described above will occur to those skilled in the art, in light of the above teachings. The scope of the invention is defined with reference to the following claims.

The invention claimed is:

1. A startup control device for a fuel cell system, the fuel cell system having a reformer which generates a hydrogen-rich reformate gas; a fuel cell which generates power using an oxidizing agent and the reformate gas supplied from the reformer, the fuel cell having a fuel cell stack and a power control circuit for controlling power generation and an output to a load circuit; and a heating device for warming the reformer; the startup control device comprising:

a temperature sensor which detects a temperature of the reformer at a single position; and a controller programmed to:

set a warm-up period of the reformer based on the temperature of the reformer detected immediately before warm-up by the temperature sensor;

set a waiting time based on a target power of the fuel cell;

control the heating device so that the warm-up operation of the reformer is performed within the warm-up period; and command the power control circuit to start output of current, after the waiting time has elapsed since stopping the warm-up operation of the reformer;

wherein the controller stores a first map that specifies the relation between the waiting time and the target power of the fuel cell, the waiting time increases as the target power of the fuel cell increases, and the controller is programmed to set the waiting time from the target power of the fuel cell, by referring to the first map.

2. The control device as defined in claim 1, further comprising a sensor for detecting a flow rate of fuel gas flowing into the reformer, wherein the controller is programmed to set the warm-up period of the reformer based on the detected flow rate of fuel gas and the temperature detected immediately before the warm-up.

3. The control device as defined in claim 1, wherein the controller is programmed to set the warm-up period of the reformer to a warm-up period under maximum flow rate of fuel gas flowing into the reformer, based on the detected temperature.

4. The control device as defined in claim 2, wherein the controller stores a second map that specifies the relation between the warm-up period of the reformer and the temperature detected immediately before the warm-up according to the flow rate of fuel gas flowing into the reformer, wherein the warm-up period decreases as the temperature detected immediately before the warm-up increases and as the flow rate of fuel gas increases, and the controller is programmed to set, by referring to the second map, the warm-up period of the reformer from the temperature of the reformer detected immediately before warm-up by the temperature sensor.

5. The control device as defined in claim 1, further comprising a secondary battery, wherein power supply source for the load circuit is switched between the fuel cell and the secondary battery depending upon whether the reformer is warming up.

6. The control device as defined in claim 1, further comprising a bypass passage by which the reformate gas bypasses the fuel cell, wherein the reformate gas flows into the bypass passage during the warm-up.

7. The control device as defined in claim 1, further comprising a heater for heating the fuel cell stack of the fuel cell.

8. The control device as defined in claim 7, further comprising a source of the oxidizing agent and a passage for mixing the oxidizing agent to the reformate gas generated by the reformer.

9. A startup control device for a fuel cell system, the fuel cell system having a reformer which generates a hydrogen-rich reformate gas; a fuel cell which generates power using an oxidizing agent and the reformate gas supplied from the reformer, the fuel cell having a fuel cell stack and a power control circuit for controlling power generation and an output to a load circuit; and a heating device for warming the reformer; the startup control device comprising:

a temperature sensor which detects a temperature of the reformer at a single position; and a controller programmed to:

set a warm-up period of the reformer based on the temperature of the reformer detected immediately before warm-up;

set a waiting time based on a target power of the fuel cell;

control the heating device so that the warm-up operation of the reformer is performed within the warm-up period; and command the power control circuit to start output of current, after the waiting time has elapsed since stopping the warm-up operation in the reformer;

wherein the controller stores a map that specifies the relation between the waiting time and the target power of the fuel cell, the waiting time increases as the target power of the fuel cell increases, and the controller is programmed to set the waiting time from the target power of the fuel cell, by referring to the map.

10. A startup control device for a fuel cell system, the fuel cell system having a reformer which generates a hydrogen-rich reformate gas; a fuel cell which generates power using an oxidizing agent and the reformate gas supplied from the reformer, the fuel cell having a fuel cell stack and a power control circuit for controlling power generation and an output to a load circuit; and a heating device for warming the reformer; the startup control device comprising:

means for detecting a temperature of the reformer at a single position;

means for setting a warm-up period of the reformer based on the temperature of the reformer detected immediately before warm-up;

means for storing a map that specifies the relation between a waiting time and a target power of the fuel cell, wherein the waiting time increases as the target power of the fuel cell increases;

means for setting the waiting time based on the target power in the fuel cell, by referring to the map;

means for controlling the heating device so that the warm-up operation of the reformer is performed within the warm-up period; and means for commanding the power control circuit to start output of current, after the waiting time has elapsed since stopping the warm-up operation in the reformer.

* * * * *